United States Patent
Kilper et al.

(10) Patent No.: US 8,995,053 B2
(45) Date of Patent: Mar. 31, 2015

(54) POSITIVE OPTICAL AMPLIFIER POWER TRANSIENT SUPPRESSION

(75) Inventors: Daniel Charles Kilper, Fair Haven, NJ (US); Christopher Alan White, Neshanic Station, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 11/616,917

(22) Filed: Dec. 28, 2006

(65) Prior Publication Data

US 2008/0158659 A1    Jul. 3, 2008

(51) Int. Cl.
H04B 10/17  (2006.01)
H04J 14/02  (2006.01)
H04B 10/296 (2013.01)
H04B 10/12  (2006.01)

(52) U.S. Cl.
CPC .......... *H04J 14/0221* (2013.01); *H04B 10/296* (2013.01); *H04J 14/0284* (2013.01); *H04J 14/0241* (2013.01); *H04J 14/0212* (2013.01); *H04J 14/0213* (2013.01); *H04J 14/0227* (2013.01)
USPC .................................................. 359/341.41

(58) Field of Classification Search
CPC .................... H01S 3/10007; H01S 3/10015
USPC .......................... 359/341.41, 341.42
See application file for complete search history.

(56) References Cited

U.S. PATENT DOCUMENTS

| | | | |
|---|---|---|---|
| 6,023,366 A * | 2/2000 | Kinoshita | 359/337.12 |
| 6,025,947 A * | 2/2000 | Sugaya et al. | 398/97 |
| 6,072,601 A * | 6/2000 | Toyohara | 358/484 |
| 6,246,514 B1 * | 6/2001 | Bonnedal et al. | 359/341.41 |
| 6,515,777 B1 * | 2/2003 | Arnold et al. | 398/97 |
| 6,538,803 B1 * | 3/2003 | Kagi | 359/337.12 |
| 7,242,864 B2 * | 7/2007 | Muzicant et al. | 398/37 |
| 2003/0147123 A1 * | 8/2003 | Kinoshita et al. | 359/341.3 |
| 2009/0116840 A1 * | 5/2009 | Perasso et al. | 398/83 |

OTHER PUBLICATIONS

OA500 Series DWDM Erbium-Doped Fiber Amplifier, Motorola, 5487-702-1K, 2002.

D.C. Kilper and S. Chandrasekhar, "Transient Gain Dynamics of Cascaded Erbium Doped Fiber Amplifiers with Re-Configured Channel Loading," 2004 Optical Society of America.

S. J. B. Yoo et al., "Observation of Prolonged Power Transients in a Reconfigurable Multiwavelength Network and Their Suppression by Gain-Clamping of Optical Amplifiers," IEEE Photonics Technology Letters, vol. 10, No. 11, Nov. 1998, pp. 1659-1661.

* cited by examiner

*Primary Examiner* — Eric Bolda
(74) *Attorney, Agent, or Firm* — Wall & Tong, LLP

(57) ABSTRACT

The present invention includes an optical amplifier and method for reducing the impact of transient events within an optical transmission system. Specifically, a positive transient power or amplifier setting adjustment limit is applied based upon a number of active channels or a current "steady state" operating condition. This adjustment limit is described in terms of a number of channels to be amplified. By controlling the adjustment limit in this manner, automatic control of the amplifier is provided for a loss of channel condition as well as for the addition of a single or few channel condition. If a larger positive transient occurs, the control will not adjust the power limit, and the positive transient power will therefore be suppressed.

20 Claims, 4 Drawing Sheets

POSITIVE OPTICAL AMPLIFIER POWER TRANSIENT SUPPRESSION

TECHNICAL FIELD

The invention relates to the field of optical telecommunications, and more particularly, to the suppression of positive optical amplifier power transients.

BACKGROUND OF THE INVENTION

In a wavelength division multiplexed (WDM) transmission system, it is possible for the power of an optical channel to be driven higher than a correct operating power level during amplification. For example, if a fiber cable is accidentally disconnected and then reconnected, a positive transient may occur during the reconnection due to the rapid increase in optical power at the input to the optical amplifier.

Generally speaking, a "primary" transient is caused by a loss of optical power in a first multiplexed group of optical channels, while "secondary" transients are caused by amplification mismatches between the surviving optical channels and subsequent portions of the network to which the surviving optical channels propagate. This mismatch may be due to errors in the transient suppression for amplifiers within the primary transient region.

SUMMARY OF THE INVENTION

In accordance with the principles of the invention, transient errors are avoided by selecting an initial level of amplification according to an anticipated number of optical channels within a multiplexed optical signal to be amplified and a desired power level of a resulting amplified multiplexed optical signal. The level of amplification is then incrementally adjusted in response to, for example, increases or decreases in the number of channels within the multiplexed optical signals.

DETAILED DESCRIPTION

The following merely illustrates the principles of the invention. The invention is primarily described within the context of positive optical amplifier power transient suppression in a mesh network. However, those skilled in the art and informed by the teachings herein will realize that the invention is also applicable to any apparatus and method that involves gain control of amplifiers.

Figure 1:
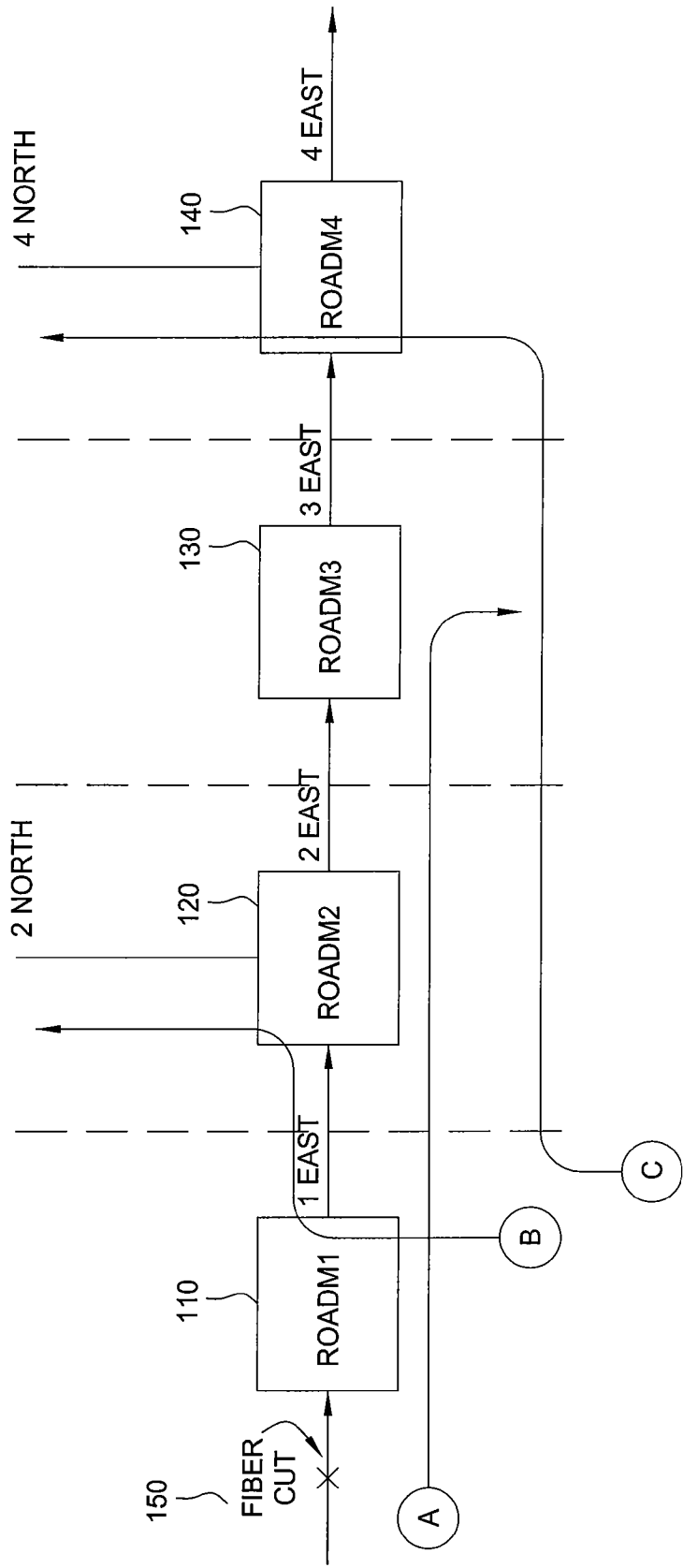
FIG. 1 depicts a high-level block diagram of a portion of a mesh network of an optical communication system according to one embodiment of the present invention.

FIG. 1 depicts a high-level block diagram of a portion of a mesh network of an optical communication system according to one embodiment of the present invention. Specifically, the depicted portion of the mesh network 100 includes four Reconfigurable Optical Add/Drop Modules (ROADMs) 110, 120, 130 and 140, which are coupled in series from WEST to EAST in the order named. As depicted in FIG. 1, there is a fiber cut in the communication path to the West of ROADM1 110. ROADM2 has an additional communication path denoted as 2NORTH. ROADM3 also has an additional communication path on 3EAST. ROADM4 has an additional communication path denoted as 4NORTH. In various embodiments, each ROADM has additional optical communication paths. The connection between the ROADMs is composed of materials and components for transmitting optical signals such as optical fibers, light guides and the like. Each ROADM is structurally similar and allows individual multiplexed input signals to be switched onto various optical fibers forming additional optical communications paths.

In one embodiment depicted in FIG. 1, the received optical signals include groups of channels, illustratively, channels of group A, group B and group C. The channels of group A travel from the West communication path through ROADM1 (and ROADM2) to ROADM3. The channels of group B enter the mesh network at ROADM1 (at a different input than the West optical communications path), travel eastward and exit the mesh network at the communication path 2NORTH of ROADM2. The channels of group C also enter the mesh network at ROADM1 (at a different input than the West optical communications path), travel eastward and exit the mesh network at the communication path 4NORTH at ROADM4. Each ROADM has amplifiers for adjusting the signal strength of the individual channels.

The fiber cut 150, when it occurs, results in a primary transient caused by the loss of channels in group A from ROADM1 to ROADM 3. As a result of the loss of group A, there is a positive gain error for the surviving channels of group B and group C at ROADM1, ROADM2 and ROADM 3. In this fiber cut example, secondary and positive transients occur on the 2NORTH, 3EAST, 4EAST, and 4NORTH paths.

Each ROADM includes at least one amplifier for adjusting the gain of optical signals passing therethrough. An automatic gain control (AGC) is used to control the gain of the amplifier. An initial amplifier gain is set to obtain a predefined channel power level based upon an expected number of received channels within a WDM signal to be amplified. A WDM signal having more optical channels is amplified by a greater amount than a WDM signal having fewer optical channels. When an expected number of received channels is greater than an actual number of received channels (e.g., due to an upstream loss of channel condition), the amplifier gain is normally lowered. Similarly, when an expected number of received channels is lower than an actual number of received channels (e.g., when one or more channels are added or switched onto a link), the amplifier gain is normally increased. However, for a positive transient condition, the amplifier does not increase its level of amplification because an adjustment due to the positive transient would lead to an incorrect setting of the amplifier. The channel number setting algorithm is explained in detail below.

Figure 2:
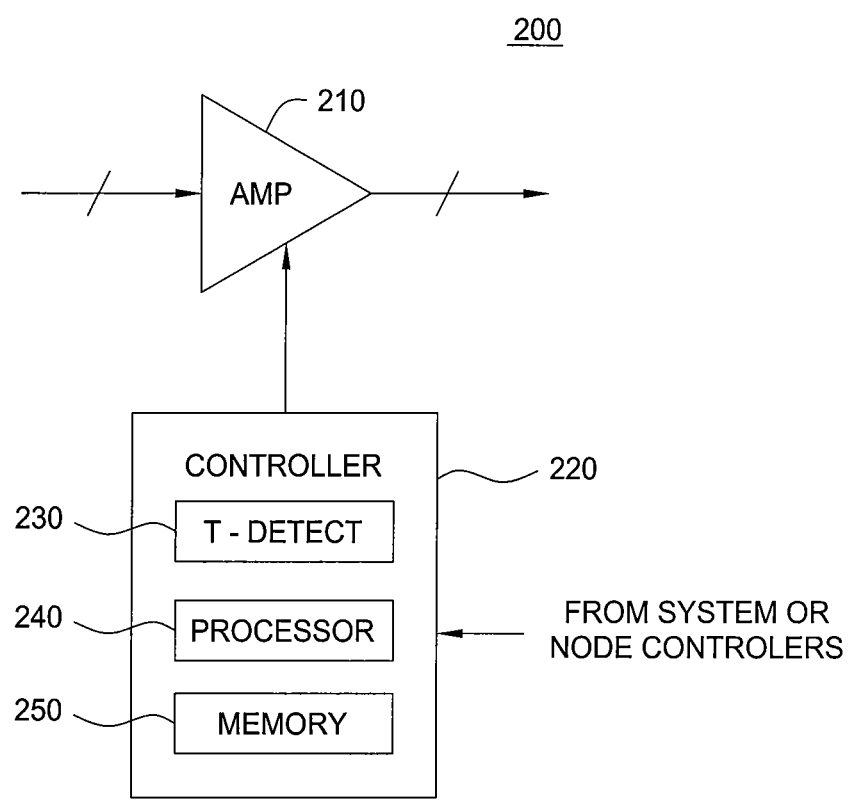
FIG. 2 depicts a high-level block diagram of a fiber amplifier according to one embodiment of the present invention.

FIG. 2 depicts a high-level block diagram of a fiber amplifier according to one embodiment of the present invention. The fiber amplifier 200 includes an optical amplifier 210 and a controller 220.

The amplifier 210 receives a WDM signal and amplifies the received WDM signal according to a gain setting provided via the controller 220. In one embodiment, individual channel gain is adjusted. In another embodiment, the gain across all channels is adjusted. In a further embodiment, the total power of the WDM signal output from the amplifier 210 is adjusted. Other adjustments to the amplifier 210 are possible in order to variably control the gain of the WDM signal.

The controller 220 includes a transient detector (T-detector) 230, a processor 240 and memory 250. The T-detector 230 monitors the transient events associated with the fiber amplifier. The T-detector determines a transient power level of the number of channels being received by the amplifier 210. The processor 240 determines the gain of the amplifier 210 using an algorithm stored in memory 250. The controller must allow for adding of channels by allowing for a predetermined amount of extra power for each channel. The controller 250 receives network information via the system controllers and/or node controllers (not shown) located in the mesh network. Using the received network information, the controller will store in its memory 250 the number of channels being received at the amplifier 210. In one embodiment, the controller 250 sets a limit to the maximum amplifier output power, which limit is related to the number of received channels. The details of an algorithm according to an embodiment of the invention are described below.

Figure 3:
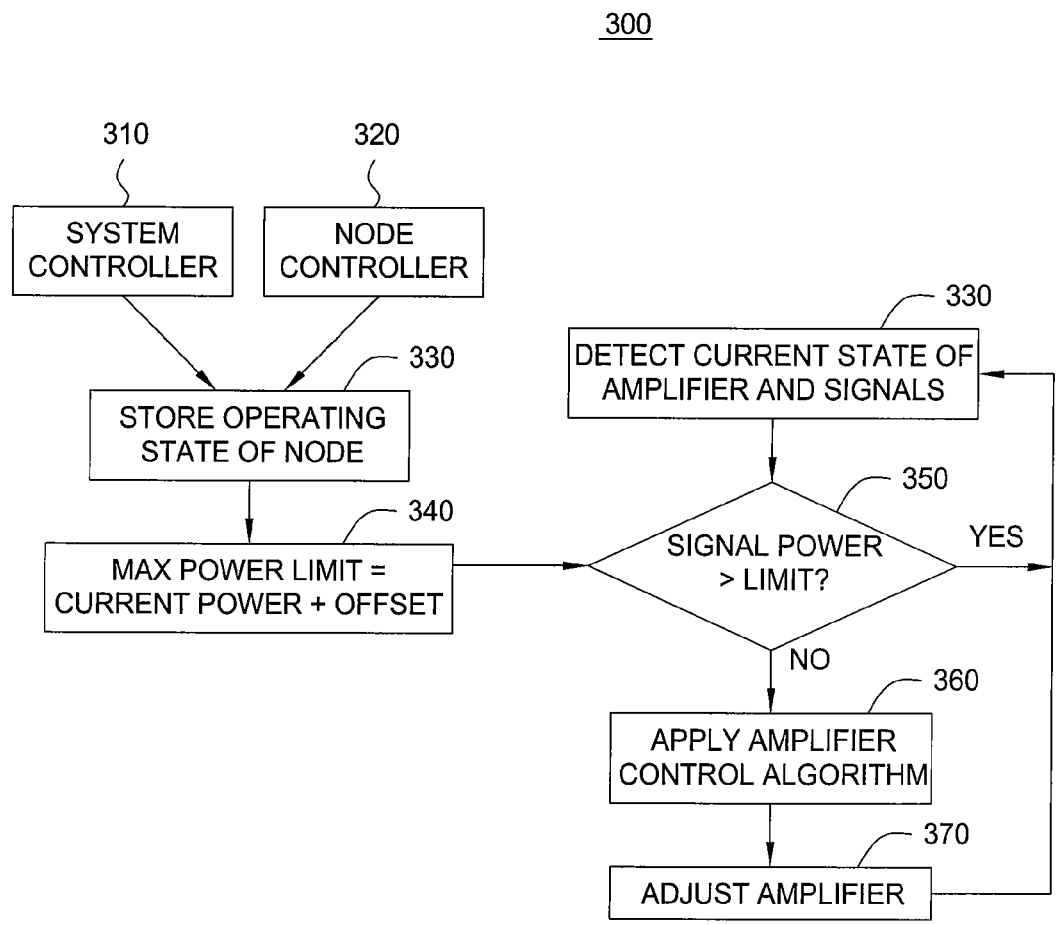
FIG. 3 depicts a flow diagram of a method according to one embodiment of the present invention.

FIG. 3 depicts a flow diagram of a method according to one embodiment of the present invention. The method 300 adapts the operation of an amplifier controller such as depicted above with respect to FIG. 2.

At step 310, a system controller monitoring the mesh network transmits at least some of the monitored information to amplifier controller 220 as network information. In one embodiment, the network information includes the number and/or paths of the channels. In another embodiment, the network information includes error information of the network. Other supervisory information may be included to assist in the amplification of the signal power of the amplifier 210.

At step 320, a node controller monitoring the operational condition of a node transmits as least some of the monitored information to amplifier controller 220 as network information. In one embodiment, the node is a ROADM. In another embodiment, the node is an OADM. In a further embodiment, the node is a repeater. The network information transmitted from the node controller includes supervisory information and/or the current state of operations of the node. In one embodiment, the information includes number of channels of the WDM signal. In another embodiment, the information includes fault conditions encountered by the node. Any supervisory information and operational information can be included in the transmission. The network information in steps 310 and 320 may be transmitted via in-band or out-of-band signaling. Other signaling methods may be used.

At step 330, the network information received by controller 220 is stored in the memory 250. The network information includes the number of channels being amplified by the amplifier 210. In one embodiment, the network information includes the number of channels being received by the node. In another embodiment, the network information includes the number of channels being added and dropped by the node. In a further embodiment, the network information also includes all the channels that are lost and did not arrive at the node. In other embodiments, additional network information such as the paths of the channels is stored in memory 250 and processed by processor 240 to improve the power output of the channels of the amplifier 210.

At step 340, the processor 240 determines the power limit of the output of the amplifier 210. The maximum power for the amplifier is determined by adding a power level offset to a current power level of the amplifier. In one embodiment, if one channel is added or switched, the power level offset is the channel power for that one additional channel. Thus, if the amplifier is currently amplifying N channels, than the maximum power limit for the amplifier would be set at the amount of power needed to amplify N+1 channels. In another embodiment, the offset is based on the "steady state" of the operating point of the amplifier. In a further embodiment, the amplification is determined on a per channel basis.

At step 350, the T-detector 230 obtains the signal power level of the amplifier 210. The processor 240 determines if the required signal power level is above an output power limit determined at step 340. When the required signal power is below the limit, the amplifier control algorithm is applied such that the gain of the amplifier is capped and the amplifier is not allowed to follow a positive transient to an incorrect amplification setting. The limit allows for the adding of channels by allowing a predetermined amount of extra power for each channel. When the required signal power is above the limit, then the current state of amplifier and signals is detected and a transient event is deemed to have occurred and the amplifier is not further adjusted. This is because allowing the amplification to follow the transient event will result in a positive gain error after amplification.

At step 360, the controller applies the amplifier control algorithm and determines if the gain of the amplifier needs to be increased or decreased. In one embodiment, the gain adjustment is applied to the amplitude of the output signal. In another embodiment, the gain adjustment is applied to each channel individually as required. Any control method can be used to adjust the gain of the amplifier.

At step 370, the controller adjusts the power level of the amplifier. The power of the amplifier is adjusted according to the calculations of the control algorithm. The control algorithm assists the controller to determine the output power of the amplifier. The control algorithm, using the network information, reduces the output power of the amplifier proportionate to the amount of channels that are dropped and increases the output power of the amplifier proportionate to the amount of channels that are added or switched. As previously noted, a maximum power of the amplifier output is provided to avoid undue influences on amplifier operation due to, for example, transient conditions in the network.

At step 380, the controller obtains the current state of the amplifier and of the WDM signal being amplified. The controller uses the detected current state information with the network information to assist in determining whether a positive transient has occurred and/or whether the power level of the surviving channels needs to be adjusted. The current state is determined by a T-detector or by a processor and photodetectors.

Figure 4:
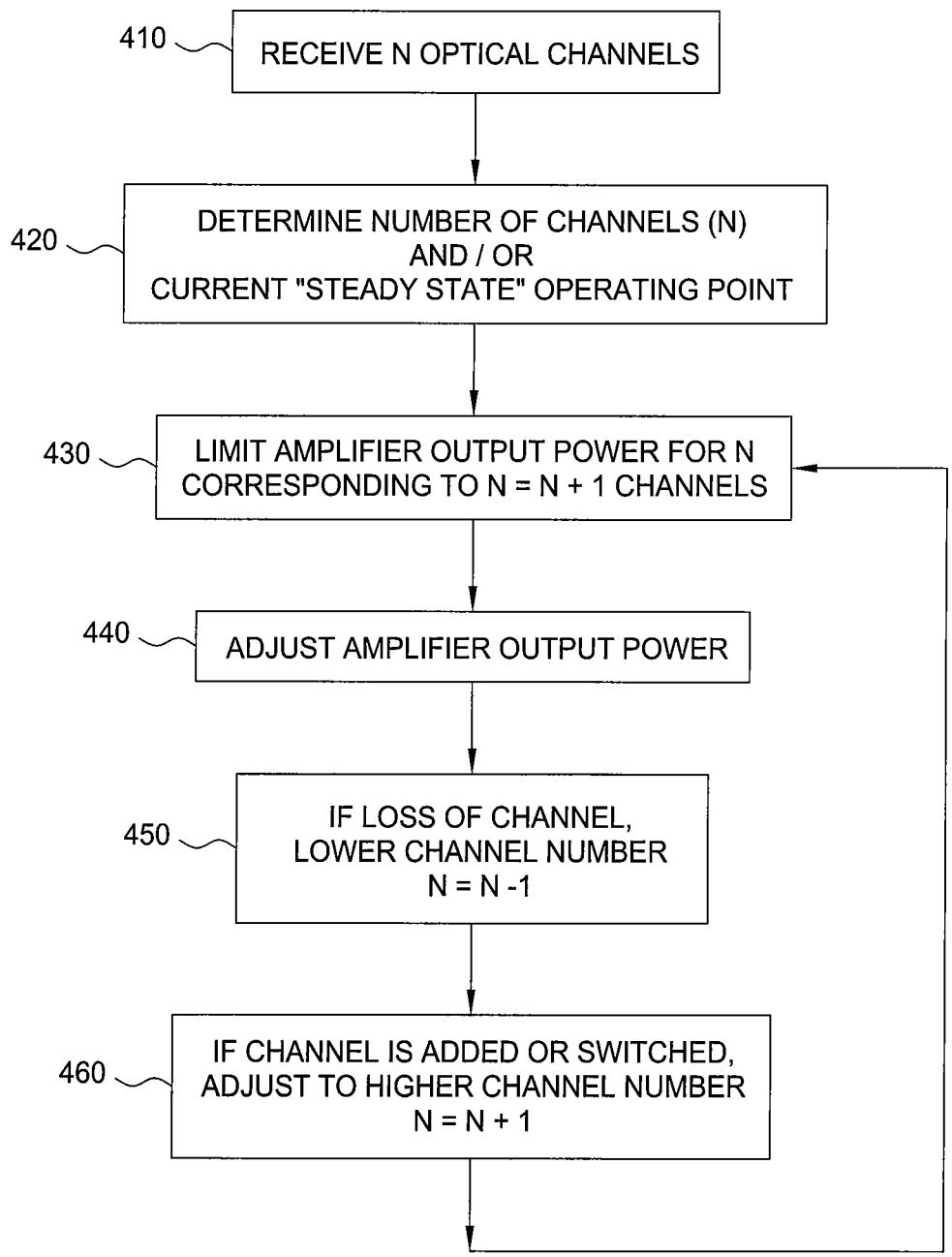
FIG. 4 depicts a flow diagram of a method according to one embodiment of the present invention.

FIG. 4 depicts a flow diagram of a method according to one embodiment of the present invention. The method 400 illustrates how a maximum power limit by using channel number information is determined in, for example, an amplifier controller such as depicted above with respect to FIG. 2.

At step 410, a node receives a plurality of optical channels. Some of the channels are dropped at the node, while others are added and switched. The optical channels are transported in a WDM signal. The node amplifies the WDM signal that is being transported to the next node. The WDM signal includes N optical channels. In one embodiment, a controller at the amplifier monitors the WDM signal for the (N) number of channels.

At step 420, the number of channels received by the node is determined. In one embodiment, the maximum power level of each channel is predetermined, and the maximum total power level of the amplifier is the total power level of all the channels. In another embodiment, the current gain of the amplifier is determined by the current "steady state" operation point of the amplifier by, for example, measuring the optical power levels of the channels at the input and output of the amplifier to calculate the current gain (e.g., in a decibel log scale).

At step 430, every channel that is transmitting an optical signal is amplified. Because the controller includes the "steady state" power of each channel, the proper output power is determined by monitoring the N number of channels. If one channel is switched or added, the maximum level of the amplifier output is increased to a power level for N+1 channels.

At step 440, the output power of the amplifier is limited to N+1 channels. If the output power is greater than the "steady state" power for N+1 channels, then a power spike resulting from a transient event is deemed to have occurred. Because a limit is set for the output power, the output power of the amplifier remains below the maximum power level for the N+1 channels. Thus, the transient power is suppressed.

At step 450, in response to a loss or drop of a channel, the channel number or count is decreased by 1 and the output power limit of the amplifier is adjusted accordingly. In another embodiment, if a plurality of channels are dropped or are lost, then the channel number will decrease proportional to the number of channel lost or dropped.

At step 460, in response to an addition of a channel or when a channel is switched onto the WDM signal, the channel number or count is increased by 1. Thus, the maximum power is adjusted accordingly. In another embodiment, if more than one channel is being added, the channel number is increased proportionally to ensure the amplifier has the proper output power limit.

In various embodiments, the amount of amplification increase (where channels are added) or decrease (where channels are dropped) may be a predetermined amount such that incremental changes in amplification are made according to the number of channels to be amplified after selection of an amplification level for an initial number of channels. The predetermined amount of amplification change may be calculated as, for example, (a) a fixed or predefined amount determined as the initial amplification level divided by N; (b) a fixed or predefined amount determined as the initial amplification level divided by N+/− a scaling factor; (c) a fixed or predefined amount that has been empirically derived and the like. Moreover, the ultimate level of amplification is bounded or clamped by a maximum amplification level such that propagation of an optical transient condition is avoided in the present network and/or a subsequent network.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for controlling an optical amplifier configured to receive a gain control signal from a controller, the method comprising:
    determining an anticipated number of optical channels within a multiplexed optical signal to be amplified by said optical amplifier;
    selecting an initial level of amplification as a function of said anticipated number of optical channels within the multiplexed optical signal and a desired power level of the resulting amplified multiplexed optical signal;
    amplifying the multiplexed optical signal according to the initial level of amplification;
    modifying the level of amplification including modification of individual power levels of optical channels in response to a change in the number of optical channels within the multiplexed optical signal according to a predefined algorithm; and
    limiting the level of amplification in response to a detected power level of the resulting multiplexed optical signal being greater than a desired power level due to a positive transient.

2. The method of claim 1, wherein modifying the level of amplification is performed in response to an anticipated change in the number of optical channels within the multiplexed optical signal.

3. The method of claim 1, wherein the level of amplification is limited to a maximum level of amplification.

4. The method of claim 1, wherein modifying the level of amplification comprises:
    increasing the level of amplification by a predefined amount for each channel added to the multiplexed optical signal; and
    decreasing the level of amplification by said predefined amount for each channel dropped from the multiplexed optical signal.

5. The method of claim 4, wherein the predefined amount is determined using the initial level of amplification and the anticipated number of optical channels within the multiplexed optical signal.

6. The method of claim 1, wherein the initial level of amplification is selected as a function of a current power level of the multiplexed optical signal added to an offset power level.

7. The method of claim 1, wherein limiting the level of amplification is performed by not modifying the level of amplification in response to a determination that the corresponding level of amplification would be greater than a desired level of amplification.

8. The method of claim 1, wherein said level of amplification is modified in response to received network information indicative of a change in the number of optical channels within the multiplexed optical signal.

9. The method of claim 1, wherein said level of amplification is modified in response to received network information indicative of a fiber cut associated with at least some of the optical channels within the multiplexed optical signal.

10. Apparatus, comprising:
    an optical amplifier, configured to amplify a multiplexed optical signal according to a gain control signal to provide an amplified multiplexed optical signal; and
    a controller, configured to determine an initial anticipated number of optical channels and for generating said gain control signal, wherein said controller sets an initial level of said gain control signal in response to said initial anticipated number of optical channels within said multiplexed optical signal and a desired total power level of a resulting amplified multiplexed optical signal;
    said controller configured to adapt the gain control signal level including modification of individual power levels of optical channels in response to a change in actual number of optical channels within the multiplexed optical signal according to a predefined algorithm;
    said controller configured to limit the gain control signal level in response to a detected power level of the resulting amplified multiplexed optical signal exceeding the desired power level due to a positive transient.

11. The apparatus of claim 10, further comprising a transient detector is configured to detect for detecting said power level of the resulting amplified multiplexed optical signal.

12. The apparatus of claim 11, wherein said transient detector is configured to determine a transient power level of the number of channels within the resulting amplified multiplexed optical signal.

13. The apparatus of claim 10, further comprising a memory is configured to store a channel count value indicative of the number of optical channels within the multiplexed optical signal, said gain control signal level being adapted in response to said channel count value being incremented or decremented.

14. The apparatus of claim 13, wherein said controller receives network information indicative of a number of channels within the multiplexed optical signal.

15. The apparatus of claim 10, wherein said controller is configured to adapt the gain control signal level by a predefined amount for each incremental increase or decrease in the number of optical channels within the multiplexed optical signal.

16. The apparatus of claim 10, wherein said optical amplifier comprises an automatic gain controlled (AGC) optical amplifier having an output level adapted in response to said gain control signal.

17. The apparatus of claim 10, wherein said optical amplifier is adapted to individually amplify each of the optical channels within the multiplexed optical signal.

18. The apparatus of claim 10, wherein said apparatus is configured to amplify a corresponding multiplexed optical signal received by an Optical Add/Drop Module.

19. A method for controlling an optical amplifier configured to receive a gain control signal from a controller, comprising:

selecting, via said controller, an initial level of amplification according to an anticipated number of optical channels within a multiplexed optical signal to be amplified by said optical amplifier, and a desired power level of a resulting amplified multiplexed optical signal;

adapting, via said controller, the initial level of amplification in response to changes in the number of optical channels within the multiplexed optical signal;

modifying, via said controller, the level of amplification including modification of individual power levels of optical channels in response to a change in the number of optical channels within the multiplexed optical signal according to a predefined algorithm; and limiting, via said controller, the level of amplification in response to a detected power level of the resulting multiplexed optical signal being greater than a desired power level due to a positive transient.

20. The method of claim 19, wherein said optical amplifier is adapted to amplify a corresponding multiplexed optical signal received by an Optical Add/Drop Module, and said controller receives network information indicative of a number of channels within the corresponding multiplexed optical signal.

* * * * *